(12) United States Patent
Kamath et al.

(10) Patent No.: US 9,679,539 B1
(45) Date of Patent: Jun. 13, 2017

(54) REAL-TIME PRESENTATION OF GEOLOCATED ENTITIES FOR EMERGENCY RESPONSE

(71) Applicant: AZTEK SECURITIES LLC, Baton Rouge, LA (US)

(72) Inventors: Nitin Kamath, Baton Rouge, LA (US); Sachin Kamath, Prairieville, LA (US); Aparna Kamath, Baton Rouge, LA (US)

(73) Assignee: AZTEK SECURITIES LLC, Baton Rouge, LA (US)

( * ) Notice: Subject to any disclaimer, the term of this patent is extended or adjusted under 35 U.S.C. 154(b) by 0 days.

(21) Appl. No.: 15/366,724

(22) Filed: Dec. 1, 2016

Related U.S. Application Data

(60) Provisional application No. 62/408,277, filed on Oct. 14, 2016.

(51) Int. Cl.
| | |
|---|---|
| *G06T 11/00* | (2006.01) |
| *G09G 5/377* | (2006.01) |
| *G06T 11/20* | (2006.01) |
| *G06F 17/30* | (2006.01) |
| *G09B 29/10* | (2006.01) |
| *G06F 17/27* | (2006.01) |

(52) U.S. Cl.
CPC ....... *G09G 5/377* (2013.01); *G06F 17/30241* (2013.01); *G06T 11/206* (2013.01); *G09B 29/102* (2013.01); *G06F 17/2725* (2013.01); *G06T 2207/20112* (2013.01); *G06T 2210/21* (2013.01)

(58) Field of Classification Search
None
See application file for complete search history.

(56) References Cited

U.S. PATENT DOCUMENTS

| | | | |
|---|---|---|---|
| 8,462,914 B2 | 6/2013 | Ragno et al. | |
| 8,489,445 B1* | 7/2013 | Berg | G06Q 30/0202 705/7.34 |
| 9,390,614 B2 | 7/2016 | Cruver et al. | |
| 2004/0243299 A1* | 12/2004 | Scaer | G08G 1/202 701/522 |
| 2005/0034075 A1* | 2/2005 | Riegelman | G09B 19/00 715/714 |
| 2007/0044539 A1* | 3/2007 | Sabol | G06Q 10/06 73/19.01 |
| 2011/0041088 A1* | 2/2011 | Mason | G06F 3/04817 715/767 |
| 2014/0095123 A1* | 4/2014 | Patnaik | G06F 7/60 703/2 |

(Continued)

Primary Examiner — Andrew G Yang
(74) Attorney, Agent, or Firm — Nilay J. Choksi; Smith & Hopen, P.A.

(57) ABSTRACT

A system and corresponding methodology for displaying in real-time geographical and situational details on-site underneath a conveyed or preselected region displayed on a web mapping service, wherein these geographical and situational details include information that is overlaid over top the conveyed or preselected region on the web map. The system can be used to formulate and implement incident/emergency response by providing knowledge under a plume, and/or can also be used to display entity information under a selected region for audit/maintenance purposes.

21 Claims, 10 Drawing Sheets
(5 of 10 Drawing Sheet(s) Filed in Color)

(56) References Cited

U.S. PATENT DOCUMENTS

| | | | |
|---|---|---|---|
| 2014/0176557 A1* | 6/2014 | Haines | G06Q 30/0205 345/440 |
| 2015/0230055 A1 | 8/2015 | Smith et al. | |
| 2015/0281287 A1 | 10/2015 | Gill et al. | |
| 2016/0036899 A1 | 2/2016 | Moody et al. | |
| 2016/0100302 A1 | 4/2016 | Barash et al. | |
| 2016/0110991 A1 | 4/2016 | Hunter et al. | |

* cited by examiner

| ID | Category | Name | 100 Ft Fire Hose Premium | Equipment | Description | Last Inspected |
|---|---|---|---|---|---|---|
| FH01 | FIRE HOSE | 100 Ft Fire Hose Premium | | Engine 1 | 100 ft | 2/4/2015 |
| L5102 | LADDER | E1-01 | | Engine 1 | 120 Ft | |
| L5101 | LADDER | E1-02 | | Engine 1 | 35 Foot | |
| G5111 | GENERATOR | E1-11 | | Engine 1 | 500 KW HONDA GAS | 11/24/2014 |
| L5201 | LADDER | E2-01 | | Engine 2 | 25 Ladder | 2/10/2015 |
| L5202 | LADDER | E2-02 | | Engine 2 | 100 Ft Ladder | |
| G5211 | GENERATOR | E2-11 | | Engine 2 | 15000 Kw Diesel GENERAC | 1/6/2015 |

FIG. 6

REAL-TIME PRESENTATION OF GEOLOCATED ENTITIES FOR EMERGENCY RESPONSE

CROSS-REFERENCE TO RELATED APPLICATIONS

This nonprovisional application claims priority to U.S. Provisional Patent Application No. 62/408,277, entitled "Geolocation presentation of entities on map while safety incident or training.", filed Oct. 14, 2016 by the same inventors, the entirety of which is incorporated herein by reference.

BACKGROUND OF THE INVENTION

1. Field of the Invention

This invention relates, generally, to incident responses. More specifically, it relates to providing vital information to first responders in helping formulate and implement a mitigation response plan.

2. Brief Description of the Prior Art

Incident management describes actions taken to identify, analyze, and correct hazards that have occurred and to prevent re-occurrences of such hazards. These actions are taken by an incident response team, who prepare for and respond to an emergency incident. The goal is to handle the situation in a way that limits damage and reduces recovery time and costs. As such, incident response plans are prepared and include policies that describe what an incident is and the step-by-step process of responding to an incident.

To formulate and implement mitigation plans in response to the occurrence of a particular incident, such as a natural disaster or other emergency, an individual had to work with several paper copies of documents where notations were made over existing markers, or new copies had to be produced to make notations, as fresh data was obtained. This resulted in several problems, including confusion about the latest data versus stale data, delays in incident response due to printing and notating, tediousness of distributing paper copies to all involved agencies, delays in incident response due to different agencies tracking activities in a manner that first responders do not readily have the latest information, maintenance of several maps to deliver data pertinent to an agency, uncertainty over data accuracy due to extended data having to be pulled from several different sources and datasets and dependence on the dataset provider, and difficulties in training due to maintenance of paper copies being cumbersome and time-consuming.

From a technical standpoint, conventional computer-based technologies are incapable of formulating data-based mitigation plans in response to the occurrence of a particular incident or hazard as the appropriate server-client communication channels did not exist, along with a lack of an ability to display the assimilated data in overlaying fashion on a map or other diagram on which the incident is indicated. Typically, as noted, when an incident occurs, its response is formulated using paper documentation having markers and hypotheticals of what should be done and where as a response to the incident. This is inefficient, and an unconventional solution to this technical problem is sought herein.

Accordingly, what is needed is a computer-based system and methodology for formulating and implementing an incident response. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved system for computer-based incidence response and entity maintenance is now met by a new, useful, and nonobvious invention.

In an embodiment, the current invention is map display system for presenting data pertaining to a geographic area under a conveyed or preselected region on a digital mapping service. Alternatively, the current invention is a tangible, non-transitory, computer-readable medium having computer-executable instructions for performing a method of running a software program on a computing device, where the computing device operates under an operating system and the method includes issuing instructions from the software program.

Included are a memory, including a database, and a computing device comprising one or more hardware processors coupled to the memory, wherein the memory has program instructions implementing a map application executable by the processor to receive into the memory a digital map from a geographic information system. The digital map ultimately includes the conveyed region, which has a defined set of boundaries, though this will become clearer as this specification continues. A mapping engine, executed by the processor, is configured to prepare and unify a map display for presentation on a display device, wherein the map display comprises elements within a viewing area of the map display. The elements include the digital map and the conveyed region. Further, the mapping engine overlays a chart display over the digital map on the map display presented on the display device, wherein the chart display comprises information pertaining to an underlying region of interest of the digital map that is disposed in underlying relation to the conveyed region and within the defined set of boundaries of the conveyed region.

A map information extraction module, executed by the processor, is configured to extract from the database the information pertaining to the underlying region of interest of the digital map (e.g., population data, household data, economic data, gender data, and a combination thereof), wherein the map information extraction module indicates the chart display and the information contained therein to be displayed on the display device. Optionally, the chart display may be generated by this module generating a list in the memory, where the list includes the pertinent information. Additionally, a display engine, executed by the processor, is configured to present on the display device the unified map display, including the digital map, the overlaid chart display, and the extracted information in the overlaid chart display. Optionally, the mapping engine may be configured further to overlay the conveyed region (e.g., hazard-based plume) on the digital map.

If there is a change to the defined set of boundaries of the conveyed region, then the mapping engine, the map information extraction module, and the display engine prepare and alter the conveyed region and thus the digital map, chart display, and the information contained therein. This change to the boundaries of the conveyed region can occur due to user input on the map display. Alternatively, if the conveyed region is a hazard-based plume, the change can occur automatically due to a change to the plume (e.g., change in temperature or wind direction).

In other embodiments where the conveyed region is a hazard-based plume, the map information extraction module is configured further to extract coordinates of an epicenter of an incident from which the plume is formed, to store the epicenter coordinates in the memory, and to parse coordinates of a primary impact zone, a secondary impact zone, and a tertiary impact zone within the plume based on the epicenter coordinates. In this case, the chart display is presented simultaneously with the information pertaining to the plume within each impact zone or within multiple or all impact zones. In a further embodiment, the map information extraction module may create a buffer polygon for each impact zone, and designate and extract an internal zone buffer from each buffer polygon. Each buffer polygon may be verified to be closed by validating coordinates of each buffer polygon, wherein the coordinates of each buffer polygon are stored in the memory. In yet a further embodiment, the map information extraction module may identify from each buffer zone the elements that are intersecting and contained, and generate the chart display by parsing the identified elements, wherein the mapping engine is configured to overlay the plume and the chart display on the digital map.

In a separate embodiment, the current invention is a computer system or a tangible non-transitory computer-readable medium, having any one or more, or even all, of the previously characteristics, features, and functions.

Benefits of the current invention include, but are not limited to, virtually real-time data/information access through Internet/cellular communication, separate layers of information that facilitate each agency's access to data relevant to itself while also having a broader understanding of the overall situation/region, accurate location information using global positioning system (GPS), extended datasets on entities for more effective incident response, and effective training due to electronically-saved scenarios.

It is an object of the current invention to provide visual on all data pertinent to a given incident, to provide virtually real-time information as a situation changes, to provide a single database that maintains all datasets used in emergency response activities, to provide easy access to a collection of scenarios for training and pre-planning purposes, to create a repository for rapid access to data for audit purposes, and to provide drawing tools for extracting data as needed from different locations.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 6 is a screenshot illustrating inventory management so that companies/users can track and record maintenance history for mobile equipment.

DETAILED DESCRIPTION OF THE PREFERRED EMBODIMENT

Figure 1:
FIG. 1 is a screenshot of a plume depicting levels of a hazard zone after an incident.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The current invention is a system and corresponding methodology for displaying in real-time geographical and situational details on-site underneath a conveyed or preselected region displayed on a web mapping service, wherein these geographical and situational details include information that is overlaid over top the conveyed or preselected region on the web map. The system relies on a wireless network (e.g., cellular network), Internet connection, or other network connection to convey or select the region on the map, and also to extract the details from under that region.

In certain embodiments, the novelty of the instant system lies in its computer-based display of the geographical details/information extracted from predetermined regions on a map, specifically displaying data of populations and entities underlying those predetermined regions by overlaying such data over the map. The information is determined and presented in a novel manner in order to aid in incidence response and entity maintenance. The system provides a new manner of accessing the data within the region selected or conveyed on the web map by providing a novel technique of extracting, analyzing, and displaying the data/information. Not only does this solve the technical problem presented by the conventional art as previously discussed, but the current system improves upon computer-related technology by directing the system server to follow a set of rules that allows the underlying computer to perform a function that was not previously performable by a computer.

The entity details or information underlying the conveyed or preselected region of the map include, but are not limited, households, population and demographics thereof, public facilities and maintenance details thereof, transportation systems and roadways, building floorplans, specific entities within a building (e.g., number of fire extinguishers and maintenance information of each), or any other measurable object or data that is pertinent for the particular situation being observed, for which the region of the map has been conveyed or selected. The entity information can be provided by a third party source (e.g., businesses, U.S. Census Bureau, individual households or communities) or imported from publicly accessible data (e.g., satellite information from the map). Alternatively or in addition, the system server can be tied into or otherwise in communication with the server of the third party source, such that information can be extracted from the third party server on an as-needed basis. In this latter scenario, the system provides a new connection between distinct modules of data, wherein when a region on the web map is selected, the coordinates are determined by the instant system based on the boundaries of the selection, and the system retrieves specific data from the third party source if the location of the underlying entity is included within those coordinates.

The system uses any known suitable web mapping service (e.g., GOOGLE MAPS) as a baseline map. GOOGLE MAPS is an effective web mapping service that can be utilized, as it offers satellite imagery, street maps and street level details, 360° panoramic views of streets, real-time traffic conditions, and route planning, among other features. The system allows users to choose from street line views, satellite views, or hybrid views (satellite with street overlay), thereby enhancing the presentation and visual details for the users/operators (e.g., first responders). The system uses the World Geodetic System (WGS; geographic coordinate system), such as the current latest version WGS 84 system which is an industry standard for cartography and geodesy and is commonly used in navigation for GPS. The margin of error is believed to be less than two (2) cm.

The system provides an abundance of drawing tools, including, but not limited to, rectangles, circles, lines and points. These suite features provide the user with the flexibility to request and visualize underlying data at customized locations or areas on the map.

The following examples are intended to be non-limiting and to be illustrative of the broader invention described previously. These examples are applications of the current system and methodology and exemplify important functionalities of the invention.

Example 1—Incidence Response

In certain embodiments, the current invention is a system and methodology for extracting and displaying real-time geographical and situational details on-site, as used/operated by first responders and emergency personnel in incidence responses. The system relies on a wireless network (e.g., cellular network), Internet connection, or other network connection to provide instant access to information pertaining to the underlying incident and the response thereto. The system enhances the user/operator's capability to quickly detect, record, and share response activities and tasks in real-time.

The system and methodology displays an aerial dispersal model (e.g., ALOHA plume) containing a plurality of informational layers underlying the plume, where the system overlays the plume on a web mapping service for user visualization. The information includes, but is not limited to, population, housing, public facilities, demographics, transportation systems and roadways, and information/data related to a geographic information system within the boundaries of the plume. Data is extracted from these underlying informational layers to assist responders in devising an effective and efficient disaster mitigation plan. Overlaying the plume and data (contained to the area within the boundaries of the plume) on the map provides a beneficial presentation to the user, for formulating and implementing a response to an incident.

ALOHA is an air hazard modeling program that, based on the chemical release information provided by the user, produces a threat zone estimate in each layer/zone of the plume. Each zone shows the geographical area where a particular hazard, such as toxicity or thermal radiation, is predicted to exceed a user-specified or predetermined LOC (e.g., measured in parts per million of a hazardous/toxic material) at some time after release of the hazard begins or after the underlying incident occurs. Using the current system, the threat zone estimates can be plotted on maps in MARPLOT, ESRI'S ARCMAP, GOOGLE MAPS, and GOOGLE EARTH (using ALOHA's KML Export). The system uses KML format, which is an industry standard to plot the ALOHA Plume on GOOGLE MAPS.

After an incident occurs, the incident epicenter location coordinates are extracted and stored in memory. From there, the hazard zones are determined, depending on details of the incident, such as type of hazard, time of day and year, and weather (e.g., using COASTAL ENVIRONMENTAL SYSTEMS C-5 SAM Weather Station which can automatically update the plume modeling software). Weather can include, for example, forecast, temperature, humidity, wind speed, and wind direction. Generally, there are three (3) hazard cones/zones in a plume, as seen in FIG. 1, where the zones can shift pivot circularly from the epicenter location based on the weather conditions, such as wind direction. The primary zone (red) represents an impact zone that is susceptible to the worst effects of the underlying incident/hazard; the secondary zone (orange) represents an impact zone that is susceptible to lower effects of the underlying incident/hazard than the primary zone; and the tertiary zone (yellow) represents an impact zone that is susceptible to less effects of the underlying incident/hazard than the secondary zone. ALOHA outputs a file with this information, and the current system parses the plume data (e.g., from ALOHA) to obtain the spatial coordinates for the primary, secondary and tertiary impact zones.

The system stores and facilitates maintenance of spatial layers containing geolocated information, for example including, but not limited to, first responders, senior citizens, academic institutions, government buildings, emergency units, and other relevant or assimilated information. This information can be inputted into the system by a user, imported from a suitable third party source, or a combination thereof. Further, the most recent census data is imported into the system—and the server database is updated—to provide accurate population levels underneath the plume, based on household, gender, and age group information down to the block level.

When epicenter location coordinates are extracted and stored, the system generates the polygons for each zone. The primary and secondary zones overlap over the tertiary zone. To eliminate information overlap, interesting areas are removed from each zone and the resulting internal zone buffer polygon coordinates are extracted. These polygons are verified to be closed by validating the start and end coordinates. This step helps ensure that the underlying information is accurate. These validated coordinates are used to find intersecting and contained elements/entities from each data layer.

Figure 2:
FIG. 2 is a screenshot illustrating data underlying a plume after an incident.

Once all layers of information are processed, a list is generated in the memory. An HTML table is generated from the list in order to display information to the user in a grid format (see FIG. 2). This list can also be overlaid on the mapping service (e.g., GOOGLE MAPS) along with the plume (i.e., the grid of FIG. 2 overlaid onto the map of FIG. 1), thus simultaneously providing an instant visual of all entities within each impact zone or within multiple or all impact zones. This information and its display overlaying the mapping service provides a specific implementation of the underlying methodology, particularly in aiding first responders and other agencies to develop an evacuation plan, to assign resources (e.g., shelters, water, food, medical, etc.), and to help mitigate the incident as applied within the underlying plume.

Figure 3:
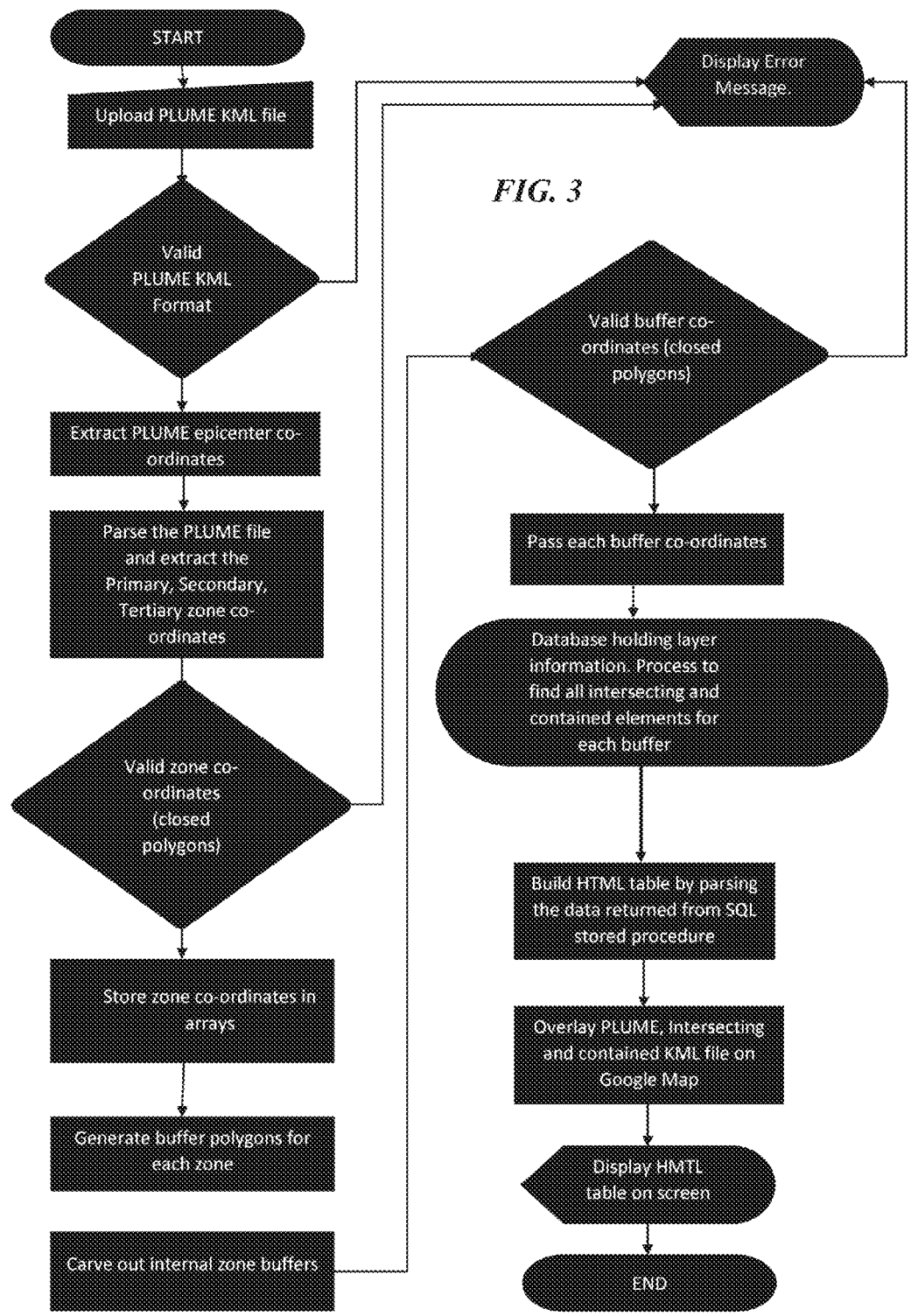
FIG. 3 is a flowchart illustrating a data extraction process, according to an embodiment of the current invention.

The system can also provide estimates of potential/likely impact of the incident on population, household, economic, and gender, for example, in the different zones. This helps in pre-positioning or efficiently relocating resources for effective and optimal response and prevention. The data extraction process is outlined in FIG. 3.

Figure 4:
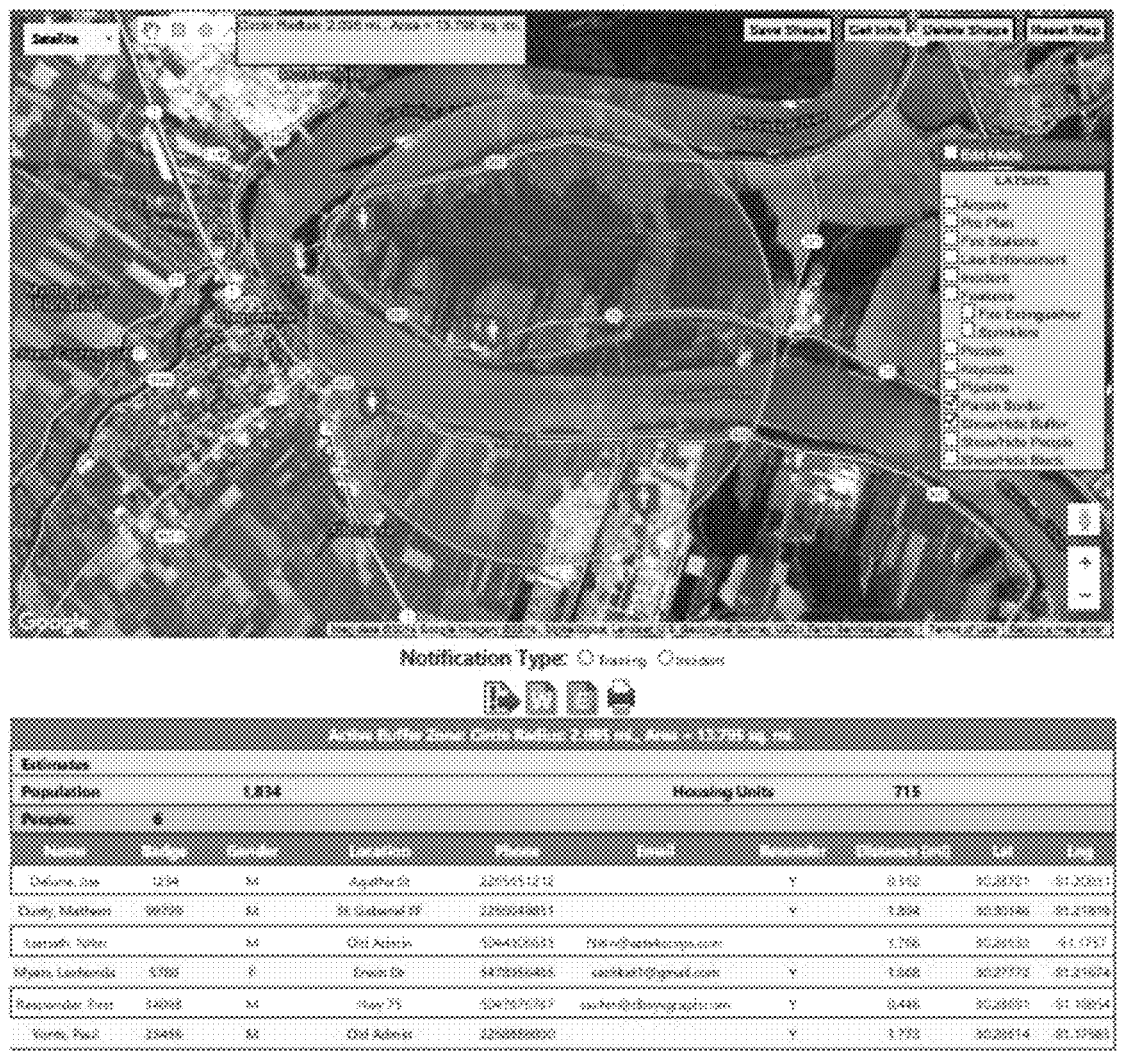
FIG. 4 is a screenshot illustrating a map with a grid of contacts shown within a selected region.

Optionally, the system is capable of printing, saving, and/or transmitting (e.g., emailing or messaging) all of the geographical and incident-related information to selected system users and/or personnel external to this system (see FIG. 4). For example, if a particular incident occurs that may affect surrounding households, then those surrounding households can be notified by the system. By saving the maps, ALOHA plume, threat rings, and entities from underlying layers, the system helps build a collection of scenarios for pre-planning and training purposes.

Example 2—Entity Maintenance

The system can also provide data in real-time for a safety audit. Generally, rather than presenting data and entities under a plume as in Example 1, the current system can present the same information under a preselected area on a map for audit/maintenance purposes. It has entity maintenance features that aid in providing up-to-date, accurate information for the underlying entities/features. A user can input a particular area on the map (e.g., drawing an enclosed region on GOOGLE MAPS), and the underlying entities/features can be seen, maintained, and updated. Data for emergency features, for example including, but not limited to, the locations of fire hydrants, fire extinguishers, hoses, valves, pipelines, etc., can be managed and maintained within the system. As an example, a building's floorplan or other infrastructure, as inputted or imported by the user, can be visualized, such that particular incidences (e.g., slip and fall accidents in a hospital setting) and occasions (e.g., prevalent areas of congregation) can be managed. Once the appropriate settings have been established (e.g., street names, location of particular entities, etc.) and the desired geographical region (e.g., block, street, floorplan, city, etc.) is visualized, an encrypted document (e.g., PDF) can be exported containing the relevant/assimilated information.

Figure 5:
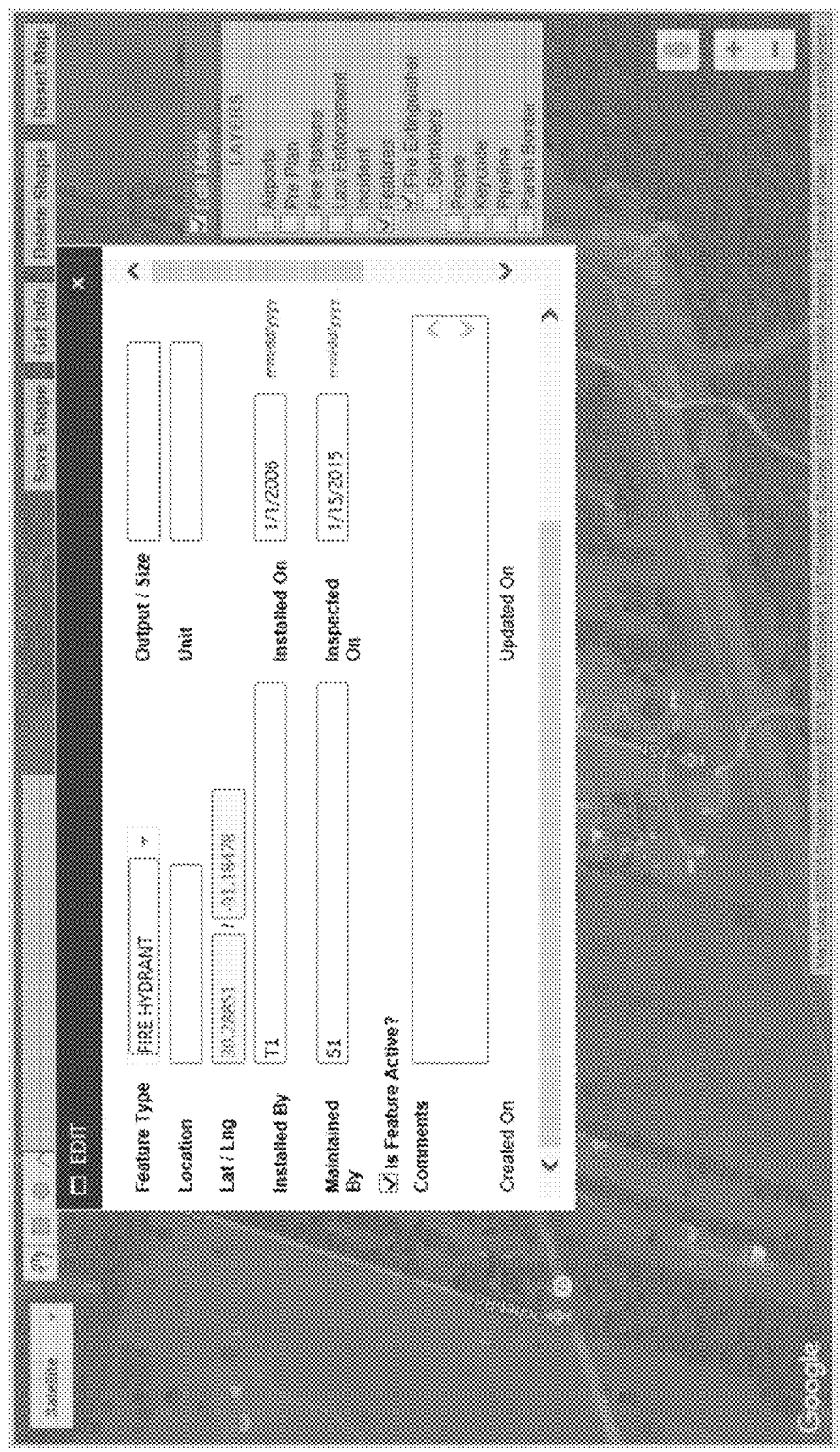
FIG. 5 is a screenshot illustrating an edit mode within a map for visualizing, updating, and/or maintaining information pertaining to a particular entity/feature.
Figure 7:
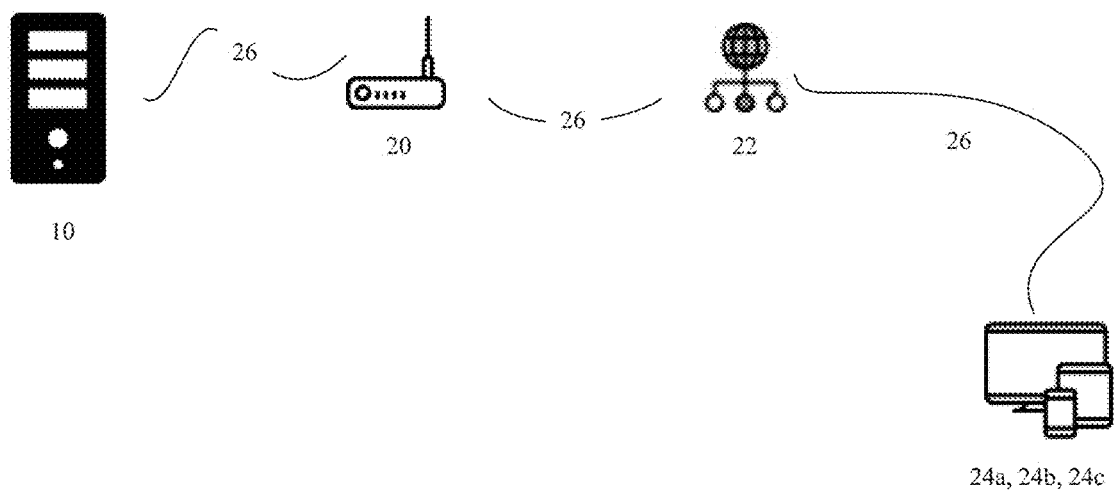
FIG. 7 depicts a general overview of system communication in a system-based response, according to an embodiment of the current invention.
Figure 8:
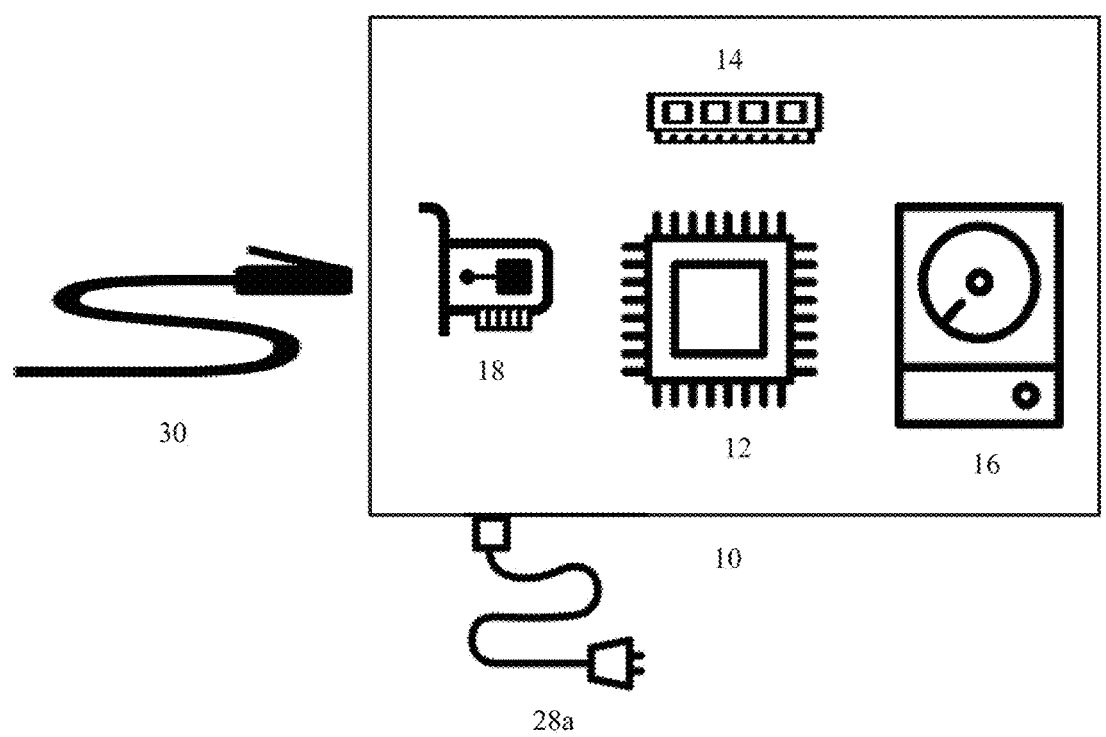
FIG. 8 depicts the system server as used in the system of FIG. 7.
Figure 9A:
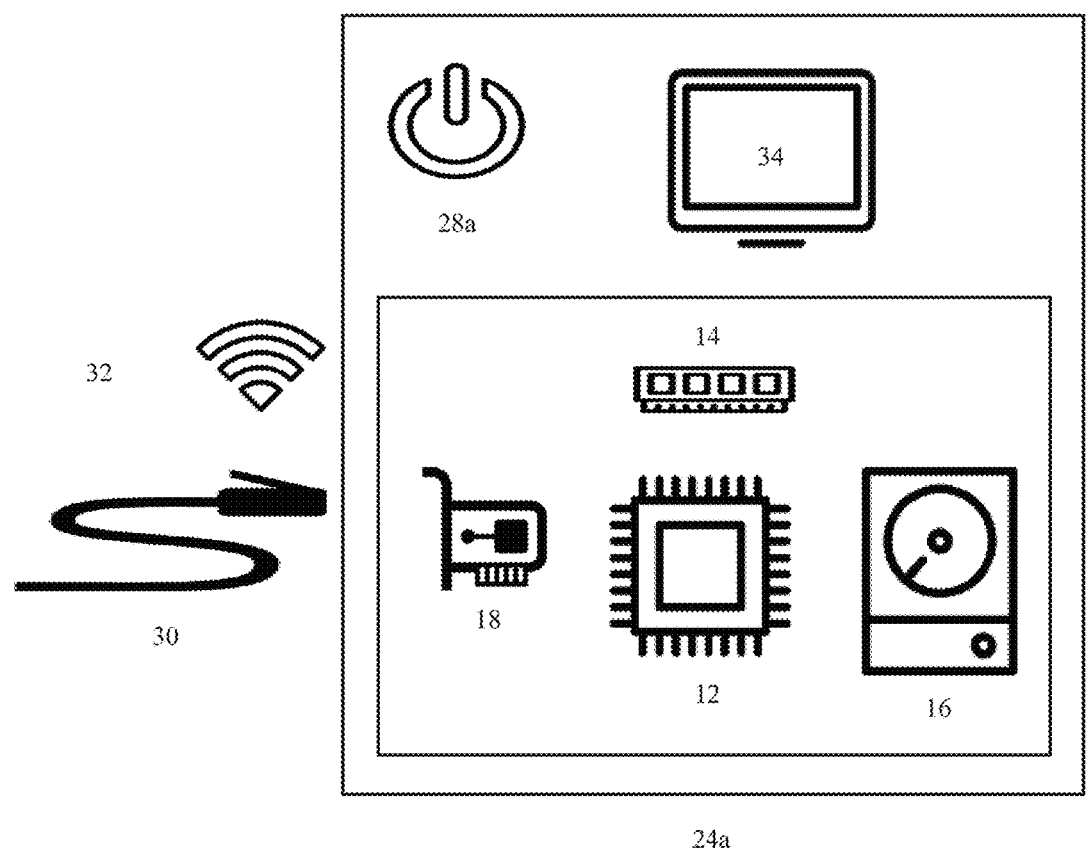
FIG. 9A depicts the client devices as used in the system of FIG. 7.
Figure 9B:
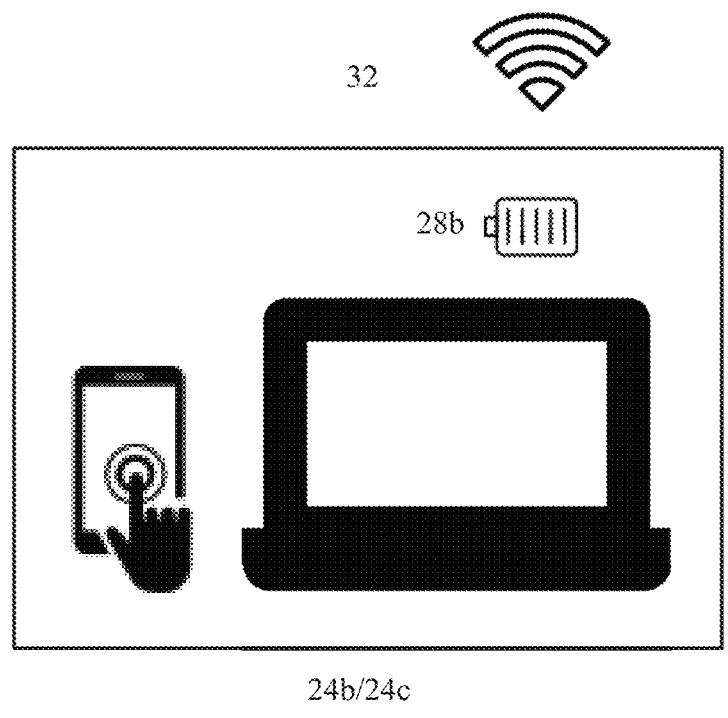
FIG. 9B depicts additional client devices as used in the system of FIG. 7.

Further, the system provides an edit mode in the map view which gives a visual for updating the correct entity/feature, thereby eliminating any errors caused by estimation (FIG. 5). Users can update the data pertaining to installation, last maintenance, date, repair details, and other relevant information that address plant safety audit checklist items. It also records update history for all entities/features, further aiding in recordkeeping for safety audits.

Additionally, the system provides the capability to track and record employee certification and training activities. Its inventory management feature allows companies to track and record maintenance history for all mobile equipment, further integrating the day-to-day activities required for response preparedness (FIG. 6).

An example will now be described herein to discuss an application of this embodiment of the current system to a hospital setting. In this setting, hospital administrators may not be interested in plumes, as in Example 1, but would be interested in the number of beds taken, maintenance of equipment inside the hospital, etc. If the map does not include an updated image of the hospital, an updated image can be obtained, for example by a drone. Alternatively or in addition, a floorplan of the hospital is exported onto a document or integrated into a map, with geolocated information also illustrated on that map. Rooms within the hospital can be color coded based on rooms that have had incidences/accidents, based on patients with particular insurances, etc. The current system is tied into the hospital's software in order to determine the beds taken, the insurances used, etc. The system server may also be pre-populated with information about the hospital, and this information would be consolidated within the server database (i.e., no need to communication with client/hospital server). Hospital administrators can then visualize what equipment has been maintained and when and what equipment is upcoming for maintenance, and can update the information as needed.

Example 3—System-Based Response

FIGS. 7, 8, and 9A-9B depict the system components used to accomplish the functionality described previously, specifically displaying in real-time geographical and situational details on-site underneath a conveyed or preselected region displayed on a web mapping service. System server 10 is a computer device that provides functionality for other client devices. In certain embodiments, the web-based architecture of the current system adheres to a client-server model, and a single overall computation is distributed across multiple devices. System server 10 provides various functionalities and services, including, but not limited to, sharing data and resources among multiple client devices and performing computations for a client device. System server 10 can serve multiple clients simultaneously, thus sharing data in real-time. Other than this computational functionality, system server 10 also hosts the database that stores all data required for the current operation.

Central processing unit (CPU) 12 is the electronic circuitry inside the computer that carries out the instructions of a computer program by performing the basic arithmetic, logical, control and input/output (I/O) operations specified by the instructions. CPU 12 is used to execute the current system-compiled binary code instructions to accomplish and implement particular actions.

Random-access memory (RAM) 14 is a form of computer data storage. A random-access memory device allows data items to be read or written in almost the same amount of time irrespective of the physical location of data inside the memory. RAM 14 is used to store and retrieve or swap the binary code as required by CPU 12.

Hard disk drive (HDD) 16—or alternatively hard disk, hard drive or fixed disk—is a data storage device used for storing and retrieving digital information. HDD 16 is used to store the entire system-compiled binary code that is swapped into RAM 14 as required by CPU 12.

Network interface controller (NIC) 18 is a computer hardware component that connects a computer to a computer network. In certain embodiments, due to the current system being web-based, NIC 18 can be an important component of the system in order to transmit and receive data back and forth between server 10, which hosts the system, and the client, who accesses the data.

Network router 20 is a device that moves data between computer networks. Routers, such as network router 20, perform the important function of directing data traffic on the Internet. A data packet is forwarded from router to router through the Internet until the data packet reaches its destination node. Network router 20 can be an important component of the current system in order to help propagate data between server 10 and the client.

The global system of interconnected computer networks termed as Internet 22 is a required component for the current system to function normally and effectively. The current system adheres to the Internet protocol suite (TCP/IP) used by devices to link worldwide and accomplish all the functionality provided by the system.

As noted, the current system is a client-server web-based application. Client 24 is a piece of computer hardware that accesses services provided by server 10. Server 10 is a computer system that is hosted from a central location, and client 24a/24b/24c accesses the service by way of network 26. Client 24a typically operates via power source 28a (A/C adapter), and clients 24b/24c typically operate via power source 28b (battery).

Category 5 cable 30, commonly referred to as Cat 5, is a twisted pair cable for carrying signals. Cat5 cable 30 forms the structured cabling for the current system. This component helps maintain the required client-server communication for the system to be operational. Alternatively or in addition, the current system is capable of functioning over wireless network 32 where data is transferred between server 10 and client 24a/24b/24c and vice versa without being physically connected by a cable. The data transfer primarily takes place over radio waves.

The system further includes display unit 34 that converts the digital signals into a visual display. The current system uses display unit 34 to illustrate the pertinent and requested information to client 24a/24b/24c and in cases of the devices indicated by reference numbers 24b/24c, display unit 34 facilitates capture and communication of the user response back to server 10 of the system.

According to certain embodiments of the current system, included are a memory, including a database, and a computing device comprising one or more hardware processors coupled to the memory, wherein the memory has program instructions implementing a map application executable by the processor to receive into the memory a digital map from a geographic information system. The digital map ultimately includes the conveyed region, which has a defined set of boundaries, though this will become clearer as this specification continues.

A mapping engine, executed by the processor, is configured to prepare and unify a map display for presentation on a display device, wherein the map display comprises elements within a viewing area of the map display. The elements include the digital map and the conveyed region. Further, the mapping engine overlays a chart display over the digital map on the map display presented on the display device, wherein the chart display comprises information pertaining to an underlying region of interest of the digital map that is disposed in underlying relation to the conveyed region and within the defined set of boundaries of the conveyed region.

A map information extraction module, executed by the processor, is configured to extract from the database the information pertaining to the underlying region of interest of the digital map (e.g., population data, household data, economic data, gender data, and a combination thereof), wherein the map information extraction module indicates the chart display and the information contained therein to be displayed on the display device. The chart display can be generated by this module generating a list in the memory, where the list includes the pertinent information discussed.

Additionally, a display engine, executed by the processor, is configured to present on the display device the unified map display, including the digital map, the overlaid chart display, and the extracted information in the overlaid chart display. Optionally, the mapping engine may be configured further to overlay the conveyed region (e.g., hazard-based plume) on the digital map.

If there is a change to the defined set of boundaries of the conveyed region, then the mapping engine, the map information extraction module, and the display engine prepare and alter the conveyed region and thus the digital map, chart display, and the information contained therein. This change to the boundaries of the conveyed region can occur due to user input on the map display. Alternatively, if the conveyed region is a hazard-based plume, the change can occur automatically due to a change to the plume (e.g., change in temperature or wind direction).

In other embodiments where the conveyed region is a hazard-based plume, the map information extraction module is configured further to extract coordinates of an epicenter of an incident from which the plume is formed, to store the epicenter coordinates in the memory, and to parse coordinates of a primary impact zone, a secondary impact zone, and a tertiary impact zone within the plume based on the epicenter coordinates. In this case, the chart display is presented simultaneously with the information pertaining to the plume within each impact zone or within multiple or all impact zones.

Further, the map information extraction module can create a buffer polygon for each impact zone, and designate and extract an internal zone buffer from each buffer polygon. Each buffer polygon can be verified to be closed by validating coordinates of each buffer polygon, wherein the coordinates of each buffer polygon are stored in the memory. Also, the map information extraction module may identify from each buffer zone the elements that are intersecting and contained, and generate the chart display by parsing the identified elements, wherein the mapping engine is configured to overlay the plume and the chart display on the digital map.

Hardware and Software Infrastructure Examples

The present invention may be embodied on various computing platforms that perform actions responsive to software-based instructions and most particularly on touch-screen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

GLOSSARY OF CLAIM TERMS

Buffer polygon: This term is used herein to refer to an impact area protruding outwardly from the incident epicenter.

Chart display: This term is used herein to refer to a visual, tabular presentation of data or information on a display device (e.g., monitor, tablet, smartphone).

Conveyed or preselected region: This term is used herein to refer to a geographic area within a larger map display, where the geographic area is indicated by a user or is generated as a plume originating from an incidence (e.g., hazardous chemical leak) occurring at a point on the map display.

Defined set of boundaries: This term is used herein to refer to distinct divisions between a conveyed or preselected region and the remainder of the digital map, so that the conveyed/preselected region can be visualized in overlying relation to the digital map.

Digital map: This term is used herein to refer to a computer- and web-based visual representation of a geographical area/region.

Display engine: This term is used herein to refer to a computer module used to generate a visual representation of a geographical area/region and present that visual representation on the display device.

Epicenter of an incident: This term is used herein to refer to a point on the digital map where a particular event (e.g., hazardous chemical spill) occurred or otherwise originated.

Hazard-based plume: This term is used herein to refer to a digital model (e.g., aerial dispersal model) that illustrates the extent to which a particular incident (e.g., hazardous chemical spill) may affect a surrounding geographic region.

Impact zone: This term is used herein to refer to an area or region within a plume on a digital map, where the area or region may be affected by an incident (e.g., hazardous chemical spill). Typically, there are multiple impact zones in a plume based on the extent to which what underlying incident can affect that particular area. For example, an area that neighbors the epicenter of the incident likely would be affected more than an area that is further from the epicenter of the incident.

Internal zone buffer: This term is used herein to refer to the zone buffer polygon extracted after removal of overlapping zone buffers.

Map display: This term is used herein to refer to a visual presentation of the digital map on a display device (e.g., monitor, tablet, smartphone).

Map information extraction module: This term is used herein to refer to a software or hardware system used to extract, analyze, and transmit information and data pertaining to a geographical area on the digital map enclosed by the boundaries of the conveyed/preselected region.

Mapping engine: This term is used herein to refer to a computer module used to generate a geographical area/region as desired by the user.

Underlying region of interest: This term is used herein to refer to a layer on the digital map representing a specific area or territory enclosed by the conveyed/preselected region or otherwise "underneath" the conveyed/preselected region. It is this specific area or territory for which further information or data is sought using the current system.

Underlying relation: This term is used herein to refer to the spatial relationship between two layers of a digital map, where a first layer is "beneath" a second layer as the first layer is overlaid by the second layer from visual and analytical standpoints.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A map display system for presenting data pertaining to a geographic area under a conveyed or preselected region on a digital mapping service, said system comprising:
    a memory including a database;
    a computing device comprising one or more hardware processors coupled to the memory, wherein the memory comprises program instructions implementing a map application executable by the one or more processors to receive into the memory a digital map from a geographic information system, wherein the digital map includes the conveyed or preselected region having a defined set of boundaries;
    a mapping engine, executed by the one or more hardware processors, configured to
        prepare and unify a map display for presentation on a display device, wherein the map display comprises elements within a viewing area of the map display, wherein the elements include the digital map and the conveyed or preselected region, and
        overlay a chart display on top of the digital map on the map display presented on the display device, wherein the chart display comprises information pertaining to an underlying region of interest of the digital map that is disposed in underlying relation to the conveyed or preselected region and within the defined set of boundaries of the conveyed or preselected region;
    a map information extraction module, executed by the one or more hardware processors, is configured to extract from the database the information pertaining to the underlying region of interest of the digital map, wherein the map information extraction module indicates the chart display and the information contained therein to be displayed on the display device; and
    a display engine, executed by the one or more hardware processors, configured to present on the display device the unified map display, including the digital map, the overlaid chart display, and the extracted information in the overlaid chart display,
    wherein the conveyed or preselected region is a hazard-based plume and wherein the map information extraction module is configured to
        extract coordinates of an epicenter of an incident from which the hazard-based plume is formed;
        store the coordinates of the epicenter of the incident in the memory; and
        parse coordinates of a primary impact zone, a secondary impact zone, and a tertiary impact zone within the hazard-based plume based on the coordinates of the epicenter of the incident,
        such that the chart display is presented simultaneously with the information pertaining to the hazard-based plume within each impact zone or within multiple or all impact zones.

2. A map display system as in claim 1, wherein as a result of a change to the defined set of boundaries of the conveyed or preselected region, the one or more processors execute the mapping engine, the map information extraction module, and the display engine to prepare and alter the map display to present a second digital map, a second chart display overlaid on the second digital map, and a second set of information extracted from and pertaining to a second underlying region of interest of the digital map in underlying relation to the changed conveyed or preselected region and within the changed defined set of boundaries thereof.

3. A map display system as in claim 2, wherein the change to the defined set of boundaries of the conveyed or preselected region occurs as a result of user input on the map display.

4. A map display system as in claim 2, wherein the conveyed or preselected region is a hazard-based plume, and wherein the change to the defined set of boundaries of the conveyed or preselected region occurs automatically as a result of a change to the hazard-based plume.

5. A map display system as in claim 1, wherein the map information extraction module is configured to
    create a buffer polygon for each impact zone;
    designate and extract an internal zone buffer from each buffer polygon.

6. A map display system as in claim 5, wherein each buffer polygon is verified to be closed by validating coordinates of the each buffer polygon, and wherein the coordinates of the each buffer polygon are stored in the memory.

7. A map display system as in claim 6, wherein the map information extraction module is configured to
    identify from the each buffer zone the elements that are intersecting and contained; and
    generate the chart display by parsing the identified elements, wherein the mapping engine is configured to overlay the hazard-based plume and the chart display on the digital map.

8. A map display system as in claim 1, wherein the mapping engine is configured to overlay the hazard-based plume on the digital map.

9. A map display system as in claim 1, wherein the information pertaining to the hazard-based plume is selected from the group consisting of population data, household data, economic data, gender data, and a combination thereof.

10. A map display system as in claim 1, wherein the map information extraction module is configured to generate a list in the memory, where the list includes the information pertaining to the underlying region of interest of the digital map, and generate the chart display from the list.

11. A map display system for presenting data pertaining to a geographic area under a hazard-based plume on a digital mapping service, said system comprising:
  a memory including a database;
  a computing device comprising one or more hardware processors coupled to the memory, wherein the memory comprises program instructions implementing a map application executable by the one or more processors to receive into the memory a digital map from a geographic information system, wherein the digital map includes the hazard-based plume having a defined set of boundaries;
  a mapping engine, executed by the one or more hardware processors, configured to
    prepare and unify a map display for presentation on a display device, wherein the map display comprises elements within a viewing area of the map display, wherein the elements include the digital map and the hazard-based plume, and
    overlay the hazard-based plume and a chart display on top of the digital map on the map display presented on the display device, wherein the chart display comprises information pertaining to an underlying region of interest of the digital map that is disposed in underlying relation to the hazard-based plume and within the defined set of boundaries of the hazard-based plume;
  a map information extraction module, executed by the one or more hardware processors, configured to
    extract from the database the information pertaining to the underlying region of interest of the digital map, wherein the map information extraction module indicates the chart display and the information contained therein to be displayed on the display device,
    extract coordinates of an epicenter of an incident from which the hazard-based plume is formed,
    store the coordinates of the epicenter of the incident in the memory,
    parse coordinates of a primary impact zone, a secondary impact zone, and a tertiary impact zone within the hazard-based plume based on the coordinates of the epicenter of the incident, such that the chart display is presented simultaneously with the information pertaining to the hazard-based plume within each impact zone or within multiple or all impact zones,
    create a buffer polygon for each impact zone;
    designate and extract an internal zone buffer from each buffer polygon, wherein the each buffer polygon is verified to be closed by validating coordinates of the each buffer polygon, and wherein the coordinates of the each buffer polygon are stored in the memory,
    identify from the each buffer zone the elements that are intersecting and contained
    generate a list in the memory by parsing the identified elements, where the list includes the information pertaining to the underlying region of interest of the digital map,
    generate the chart display from the list
    wherein the mapping engine is configured to overlay the hazard-based plume and the chart display on the digital map;
  a display engine, executed by the one or more hardware processors, configured to present on the display device the unified map display, including the digital map, the overlaid chart display, and the extracted information in the overlaid chart display,
  wherein as a result of a change to the defined set of boundaries of the hazard-based plume, the one or more processors execute the mapping engine, the map information extraction module, and the display engine to prepare and alter the map display to present a second digital map, a second chart display overlaid on the second digital map, and a second set of information extracted from and pertaining to a second underlying region of interest of the digital map in underlying relation to the changed hazard-based plume and within the changed defined set of boundaries thereof,
  wherein the change to the defined set of boundaries of the hazard-based plume occurs automatically based on changes to underlying conditions that affect the trajectory of the hazard-based plume,
  wherein the information pertaining to the hazard-based plume is selected from the group consisting of population data, household data, economic data, gender data, and a combination thereof.

12. One or more tangible non-transitory computer-readable media having computer-executable instructions for performing a method of running a software program on a computing device, the computing device operating under an operating system, the method including issuing instructions from the software program comprising:
  receive a digital map from a geographic information system, wherein the digital map includes a conveyed or preselected region having a defined set of boundaries;
  preparing and unifying a map display for presentation on a display device, wherein the map display comprises elements within a viewing area of the map display, wherein the elements include the digital map and the conveyed or preselected region;
  extracting the information pertaining to the underlying region of interest of the digital map, wherein the map information extraction module indicates the chart display and the information contained therein to be displayed on the display device;
  overlaying a chart display on top of the digital map on the map display presented on the display device, wherein the chart display comprises information pertaining to an underlying region of interest of the digital map that is disposed in underlying relation to the conveyed or preselected region and within the defined set of boundaries of the conveyed or preselected region; and
  presenting on the display device the unified map display, including the digital map, the overlaid chart display, and the extracted information in the overlaid chart display,
  wherein the conveyed or preselected region is a hazard-based plume and wherein the issuing instructions from the software program further comprises extracting coordinates of an epicenter of an incident from which the hazard-based plume is formed;

storing the coordinates of the epicenter of the incident in the memory; and parsing coordinates of a primary impact zone, a secondary impact zone, and a tertiary impact zone within the hazard-based plume based on the coordinates of the epicenter of the incident, such that the chart display is presented simultaneously with the information pertaining to the hazard-based plume within each impact zone or within multiple or all impact zones.

13. One or more tangible non-transitory computer-readable media as in claim 12, wherein as a result of a change to the defined set of boundaries of the conveyed or preselected region, the issuing instructions from the software program further comprises preparing and altering the map display to present a second digital map, a second chart display overlaid on the second digital map, and a second set of information extracted from and pertaining to a second underlying region of interest of the digital map in underlying relation to the changed conveyed or preselected region and within the changed defined set of boundaries thereof.

14. One or more tangible non-transitory computer-readable media as in claim 13, wherein the change to the defined set of boundaries of the conveyed or preselected region occurs as a result of user input on the map display.

15. One or more tangible non-transitory computer-readable media as in claim 13, wherein the conveyed or preselected region is a hazard-based plume, wherein the change to the defined set of boundaries of the conveyed or preselected region occurs automatically as a result of a change to the hazard-based plume.

16. One or more tangible non-transitory computer-readable media as in claim 12, wherein the issuing instructions from the software program further comprises:

creating a buffer polygon for each impact zone;

designating and extracting an internal zone buffer from each buffer polygon.

17. One or more tangible non-transitory computer-readable media as in claim 16, wherein the each buffer polygon is verified to be closed by validating coordinates of the each buffer polygon, and wherein the coordinates of the each buffer polygon are stored in the memory.

18. One or more tangible non-transitory computer-readable media as in claim 17, wherein the issuing instructions from the software program further comprises:

identifying from the each buffer zone the elements that are intersecting and contained; and generating the chart display by parsing the identified elements, wherein the mapping engine is configured to overlay the hazard-based plume and the chart display on the digital map.

19. One or more tangible non-transitory computer-readable media as in claim 12, wherein the issuing instructions from the software program further comprises overlays the hazard-based plume on the digital map.

20. One or more tangible non-transitory computer-readable media as in claim 12, wherein the information pertaining to the hazard-based plume is selected from the group consisting of population data, household data, economic data, gender data, and a combination thereof.

21. One or more tangible non-transitory computer-readable media as in claim 12, wherein the issuing instructions from the software program further comprises generating a list in the memory, where the list includes the information pertaining to the underlying region of interest of the digital map, and generate the chart display from the list.

* * * * *